United States Patent
Hamdi

(10) Patent No.: US 12,418,556 B2
(45) Date of Patent: Sep. 16, 2025

(54) SYSTEMS AND METHODS FOR MONITORING RISK SCORES BASED ON DYNAMIC ASSET CONTEXT

(71) Applicant: Acentium Inc, Boston, MA (US)

(72) Inventor: Amine Hamdi, Boston, MA (US)

(73) Assignee: Acentium Inc, Boston, MA (US)

( * ) Notice: Subject to any disclaimer, the term of this patent is extended or adjusted under 35 U.S.C. 154(b) by 181 days.

(21) Appl. No.: 17/490,546

(22) Filed: Sep. 30, 2021

(65) Prior Publication Data

US 2022/0109689 A1    Apr. 7, 2022

Related U.S. Application Data

(60) Provisional application No. 63/086,906, filed on Oct. 2, 2020.

(51) Int. Cl.
   *H04L 9/40*    (2022.01)
   *G06Q 10/0635*    (2023.01)

(52) U.S. Cl.
   CPC ..... *H04L 63/1433* (2013.01); *G06Q 10/0635* (2013.01)

(58) Field of Classification Search
   CPC ............. H04L 63/1433; H04L 63/0428; H04L 63/102; H04L 63/0263; G06Q 10/0635; G06F 21/577
   See application file for complete search history.

(56) References Cited

U.S. PATENT DOCUMENTS

| | | | |
|---|---|---|---|
| 9,294,498 B1 * | 3/2016 | Yampolskiy | H04L 61/4511 |
| 10,218,697 B2 * | 2/2019 | Cockerill | H04L 63/083 |
| 10,237,240 B2 * | 3/2019 | Phillips | H04L 63/0263 |
| 10,643,214 B2 * | 5/2020 | Esman | G06Q 20/4016 |
| 11,349,863 B2 * | 5/2022 | Akella | H04L 63/1433 |
| 2014/0359777 A1 | 12/2014 | Lam et al. | |
| 2017/0124328 A1 * | 5/2017 | Krishnapura | G06F 21/57 |
| 2019/0327259 A1 * | 10/2019 | DeFelice | G06N 3/044 |
| 2020/0252422 A1 | 8/2020 | Davis et al. | |
| 2021/0216928 A1 * | 7/2021 | O'Toole | G06F 16/29 |
| 2022/0083652 A1 * | 3/2022 | Ransford | G06F 21/552 |

FOREIGN PATENT DOCUMENTS

| | | | | |
|---|---|---|---|---|
| EP | | 4049433 B1 * | 9/2024 | G06F 21/552 |
| WO | WO-2015/199719 A1 | | 12/2015 | |

OTHER PUBLICATIONS

International Search Report and the Written Opinion on PCT Appl. Ser. No. PCT/US2021/053087 dated Feb. 10, 2022 (12 pages).
International Preliminary Report on Patentability on PCT Appl. Ser. No. PCT/US2021/053087 dated Apr. 13, 2023 (7 pages).

* cited by examiner

*Primary Examiner* — Michael R Vaughan
(74) *Attorney, Agent, or Firm* — Foley & Lardner LLP

(57) ABSTRACT

Systems and methods for managing asset risk in computer environment can include receiving, by one or more processors, data indicative of attributes of an asset of the computer environment. The one or more processors can determine a risk context based on the data indicative of the attributes of the asset. The one or more processors can update a risk score of the asset based at least on the risk context. The one or more processors can adjust, responsive to the risk score of the asset, a configuration parameter of at least one of the asset or another asset to mitigate a security risk associated with the asset.

20 Claims, 7 Drawing Sheets

SYSTEMS AND METHODS FOR MONITORING RISK SCORES BASED ON DYNAMIC ASSET CONTEXT

CROSS REFERENCE TO RELATED APPLICATIONS

This application claims priority to, and the benefit of, U.S. Provisional Application No. 63/086,906 filed on Oct. 2, 2020, and entitled "SYSTEMS AND METHODS FOR MONITORING RISK SCORES BASED ON DYNAMIC ASSET CONTEXT," which is incorporated herein by reference in its entirety.

FIELD OF THE DISCLOSURE

The present application relates generally to systems and methods for risk monitoring and management in a computer environment. Specifically, the present application relates to systems and methods for monitoring and managing asset risk in a computer environment based on dynamically changing asset context.

SUMMARY OF THE DISCLOSURE

According to at least one aspect, a system for managing asset risk in computer environments can include one or more processors communicatively coupled to a computer environment and a memory storing computer code instructions. The computer code instructions, when executed by the one or more processors, cause the one or more processors to receive data indicative of one or more attributes of an asset of the computer environment. The one or more processors can determine a risk context of the asset based on the data indicative of the one or more attributes of the asset. The one or more processors can update a risk score of the asset based at least on the risk context. The one or more processors can adjust, responsive to the risk score of the asset, at least one of a configuration parameter of at least one of the asset or another asset to mitigate a security risk associated with the asset.

In some implementations, the one or more processors can compare the risk score of the asset to a threshold value, and adjust the configuration parameter of the at least one of the asset or said another asset based on comparison of the risk score of the asset to the threshold value. In some implementations, in adjusting the configuration parameter of the at least one of the asset or said another asset, the one or more processors can limit access of the asset to one or more resources of the computer environment responsive to the risk score of the asset. In some implementations, in adjusting the configuration parameter of the at least one of the asset or said another asset, the one or more processors can activate data encryption for the asset responsive to the risk score of the asset. In some implementations, in adjusting the configuration parameter of the at least one of the asset or said another asset, the one or more processors can quarantine one or more components of the asset responsive to the risk score of the asset. In some implementations, in adjusting the configuration parameter of the at least one of the asset or said another asset, the one or more processors can change a security zone assigned to the asset responsive to the risk score of the asset. In some implementations, in adjusting the configuration parameter of the at least one of the asset or said another asset, the one or more processors can change one or more security rules associated with a firewall of the computer environment responsive to the risk score of the asset.

In some implementations, the one or more processors can provide at least one of an indication of the risk score or an alert signal for display on a display device, responsive to the risk score of the asset. In some implementations, the data indicative of the attributes of the asset can include at least one of an indication of a type of communication network to which the asset is currently connected, an indication of a geolocation of the asset, an indication of a user using or accessing the asset, an indication of one or more recent activities of the asset, an indication of one or more applications or software modules executing on the asset, or an indication of application or software module recently installed on or recently removed from the asset.

In some implementations, in determining the risk context, the one or more processors can perform at least one of determining a user profile of a user using or accessing the asset, determining data stored by the asset, determining resources accessible by the asset, or determining dependencies of the asset.

According to at least another aspect, a method for managing asset risk in computer environments can include receiving, by one or more processors, data indicative of attributes of an asset of the computer environment. The method can include determining, by the one or more processors, a risk context based on the data indicative of the attributes of the asset. The method can include updating, by the one or more processors, a risk score of the asset based at least on the risk context. The method can include adjusting, by the one or more processors, responsive to the risk score of the asset, a configuration parameter of at least one of the asset or another asset to mitigate a security risk associated with the asset.

In some implementations, the method can include comparing the risk score of the asset to a threshold value, and adjusting the configuration parameter of the at least one of the asset or said another asset based on comparison of the risk score of the asset to the threshold value. In some implementations, adjusting the configuration parameter of the at least one of the asset or said another asset can include limiting access of the asset to one or more resources of the computer environment responsive to the risk score of the asset. In some implementations, adjusting the configuration parameter of the at least one of the asset or said another asset can include activating data encryption for the asset responsive to the risk score of the asset. In some implementations, adjusting the configuration parameter of the at least one of the asset or said another asset can include quarantining one or more components of the asset responsive to the risk score of the asset. In some implementations, adjusting the configuration parameter of the at least one of the asset or said another asset can include changing a security zone assigned to the asset responsive to the risk score of the asset. In some implementations, adjusting the configuration parameter of the at least one of the asset or said another asset can include changing one or more security rules associated with a firewall of the computer environment responsive to the risk score of the asset.

In some implementations, the method can include providing at least one of an indication of the risk score or an alert signal for display on a display device, responsive to the risk score of the asset. In some implementations, the data indicative of the attributes of the asset can include at least one of an indication of a type of communication network to which the asset is currently connected, an indication of a geolocation of the asset, an indication of a user using or accessing the asset, an indication of one or more recent activities of the asset, an indication of one or more applications or software modules executing on the asset, or an indication of application or software module recently installed on or recently removed from the asset.

In some implementations, determining the risk context can include at least one of determining a user profile of a user using or accessing the asset, determining data stored by the asset, determining resources accessible by the asset, or determining dependencies of the asset.

According to yet another aspect, a computer-readable medium can include computer code instructions stored thereon. The computer code instructions when executed by one or more processors cause the one or more processors to receive data indicative of one or more attributes of an asset of a computer environment. The one or more processors can determine a risk context of the asset based on the data indicative of the one or more dynamic attributes of the asset. The one or more processors can update a risk score of the asset based at least on the risk context The one or more processors can adjust, responsive to the risk score of the asset, at least one of a configuration parameter of at least one of the asset or another asset to mitigate a security risk associated with the asset.

DETAILED DESCRIPTION

For purposes of reading the description of the various embodiments below, the following descriptions of the sections of the specification and their respective contents may be helpful:

Section A describes a computing and network environment which may be useful for practicing embodiments described herein.

Section B describes systems and methods for monitoring and managing asset risk in a computer environment.

A. Computing and Network Environment

Figure 1A:
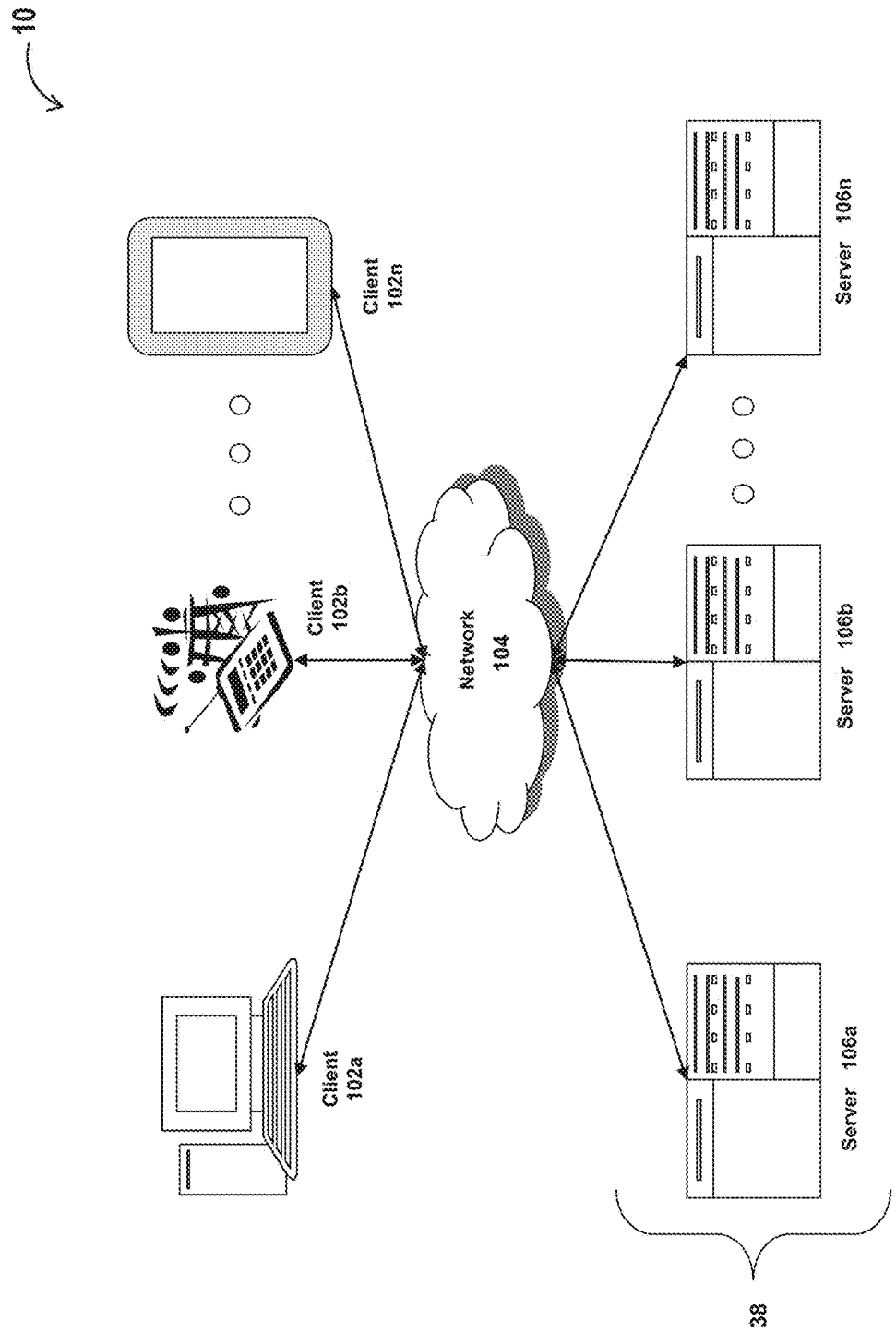
FIG. 1A is a block diagram depicting an embodiment of a network environment comprising local devices in communication with remote devices.

In addition to discussing specific embodiments of the present solution, it may be helpful to describe aspects of the operating environment as well as associated system components (e.g., hardware elements) in connection with the methods and systems described herein. Referring to FIG. 1A, an embodiment of a computing and network environment 10 is depicted. In brief overview, the computing and network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 1G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the computing and network environment 10 may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS 8 or 10, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, firewall, Internet of Things (IoT) controller. In one embodiment, the server 106 may be referred to as a remote machine or a node. In another embodiment, a plurality of nodes 290 may be in the path between any two communicating servers.

Figure 1B:
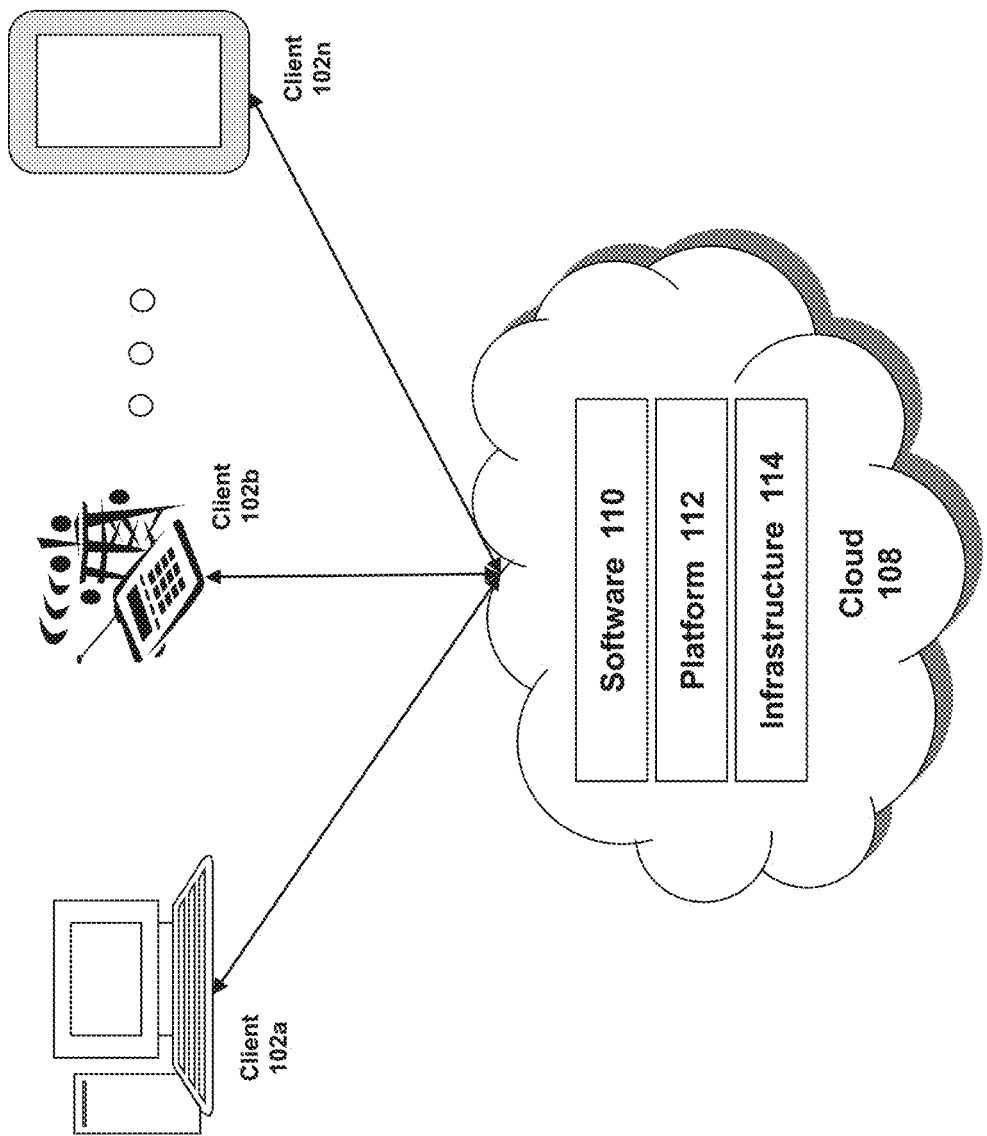
FIGS. 1B-1D are block diagrams depicting embodiments of computers useful in connection with the methods and systems described herein.

Referring to FIG. 1B, a cloud computing environment is depicted. The cloud computing environment can be part of the computing and network environment 10. A cloud computing environment may provide client 102 with one or more resources provided by the computing and network environment 10. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation.

Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, for example, Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
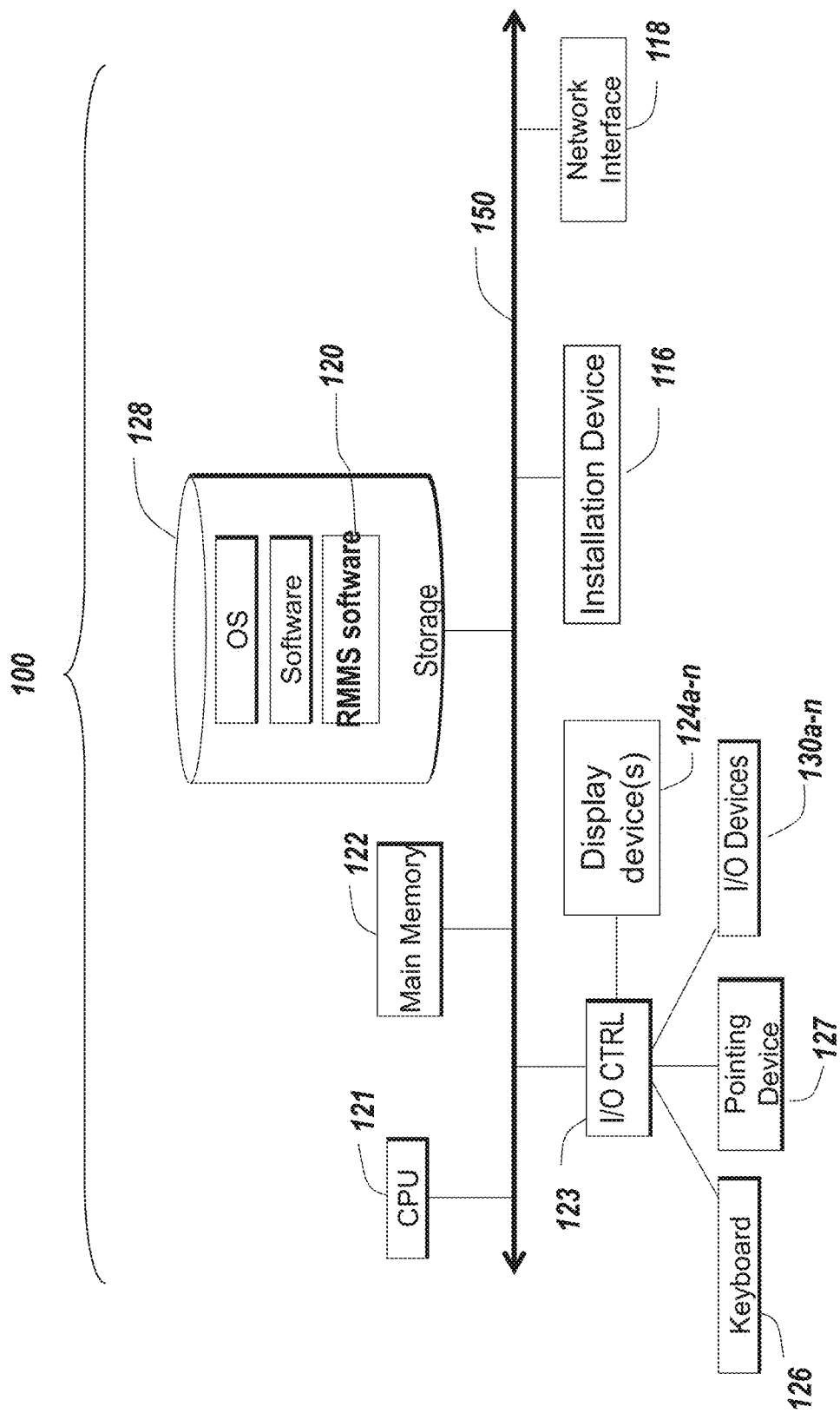
Figure 1D:
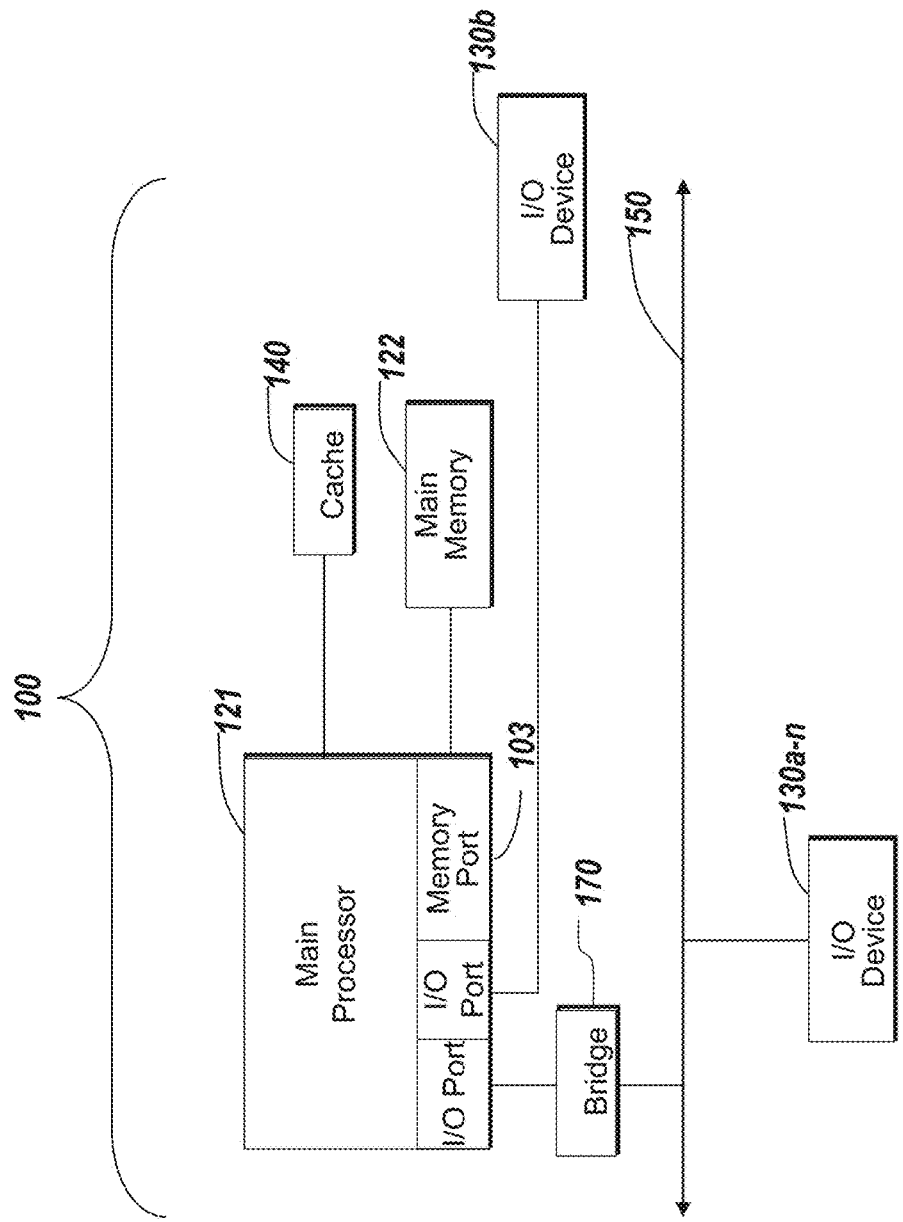

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, a risk monitoring and management system (RMMS) software 120, and/or other software, among others. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, B SRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the RMMS software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington In other embodiments, the computing device 100 is a eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, central processing unit (CPU) and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Asset Risk Monitoring and Management

Information technology (IT) risk management constitutes a component of business risk management. Most organizations or entities rely heavily on their computer environments to carry out daily business transactions, manage their finances and/or workforce, conduct research and/or development activities, provide customer services or maintain data records, among others. Failure of a computer environment or a portion thereof can have significant implications on the business of the organization or entity associated with the computer environment. For example, for an e-commerce company, unavailability of the respective e-commerce website even for few hours could result in many possible transactions lost. Also, for many companies or organizations, enterprise network failure could prevent respective employees from connecting to the enterprise network and therefore lead to loss of significantly many work hours. Furthermore, unauthorized access to business data, such as data related to trade secrets or other confidential information, can jeopardize the business value of such data. Similarly, breach of users' privacy (e.g., due to unauthorized access to users' data) can result in legal liability and damaged business reputation for many organizations or companies. These example contingencies, among others, call for reliable and accurate monitoring, assessment and management of IT risk in real time or near real time.

A computer environment can be attacked via any of the respective assets. As such, reliable management of risks associated with the computer environment calls for continuous monitoring of assets of the computer environment and assessment of respective risks. IT risk management can include assigning a respective risk profile or score to each asset of the computer environment. For each asset, the respective risk profile or score can be assigned based mainly on static (or not frequently changing) attributes, such as the hardware and the software associated with the asset. In other words, asset risk profiling or scoring can be independent of frequently varying asset attributes, such as the user(s) using or accessing the asset, the user's or the asset's geolocation, the application(s) or data associated with the asset the user(s) is using or the network to which the asset is connected. For example, two client devices of the same type, the same model and the same operating system (OS) can be assigned the same risk profile or score because they have the same hardware, the same OS and the same application footprint. However, one of the client devices may be configured to store or access more confidential data than the other, may be connected to a more secure network than the other, or may be used by a user with a wider system or data access than a user of the other client device. Also, if one of the devices is breached, the respective risk profile or score should change to reflect the new state or context of that device.

In general, the context or state of an asset can vary over time. As used herein, an asset can be a software asset, a hardware asset, a data asset or a combination of both. A software asset can include, for example, a software subsystem, a software server, a software code, a software component, or a script, among others. A hardware asset can include a hardware server, a client computing device, a storage device, a network device, a power device, a microprocessor, a microchip, a printed circuit board, a controller, a circuitry, a sensor, a camera, or other electric, electronic or electromechanical device, among others. A data asset can be a database, a data file or document, a data structure, a web site, a web page, an input or output of a system or application or a combination thereof. The change of the context or state of the asset can increase or decrease the risk of the asset. As such, reliable IT risk management calls for continuous monitoring of asset context or state and updating the asset risk profile or score responsive to changes of the asset context or state.

Dynamically monitoring and managing asset risk profiles or scores allow for real time, or near real time, risk assessment. An administrator or IT security system of the computer environment can take proper and timely mitigation steps or measures based on the real time, or near real time, risk assessment. For example, the administrator or IT security system can timely take proper measures or acts, such as locking access to an asset or a component thereof (e.g., quarantining the asset or a respective component), limiting asset access to resources of the computer environment and/or activating data encryption or other security measures for or on the asset, to nullify or mitigate any asset elevated risk. Furthermore, monitoring asset risk profiles or scores over time allows for more secure reconfiguration or architecture of the computer environment. Specifically, the administrator or IT security system of the computer environment can correlate elevated asset risk scores over time to specific architectural or configuration features of the computer environment, and propose modifications to the specific architectural or configuration features. For instance, the asset risk scores can be due at least in part to lack of (or insufficient)) redundancy in the architecture of the computer environment. In addition, the monitoring of risk profiles or scores of various assets of the computer environment over-time allows for accurate assessment of insurance cost.

To improve the accuracy and reliability of IT risk management, systems, devices and methods described herein define the risk profiles or scores of a plurality of assets based on the current context or state of each asset. The current context or state of an asset can include the user currently using or accessing the asset, the user's profile, the user's geolocation, the applications and/or software currently stored on the asset, the applications and/or software of the asset currently running, the data currently stored on the asset or changes thereof, the data currently accessed by (or via) the asset, the current geolocation of the asset, the current network to which the asset is currently connected, the current security state of the asset (e.g., breached or not), or a combination thereof among others. As such, the risk profile or score of the asset can vary as the user(s) using or accessing the asset changes, the user profile changes or the user location changes. In general, the risk profile or score of the asset can change over time responsive to changes in the context or state of the asset. For example, as more sensitive data is stored or accessed by the asset (or via the asset), the risk profile or score of the asset can change. Similarly, as the user or the asset (e.g., a mobile device) moves from an enterprise network to a public or a less secure network, the risk profile or score of the asset can change.

Figure 2:
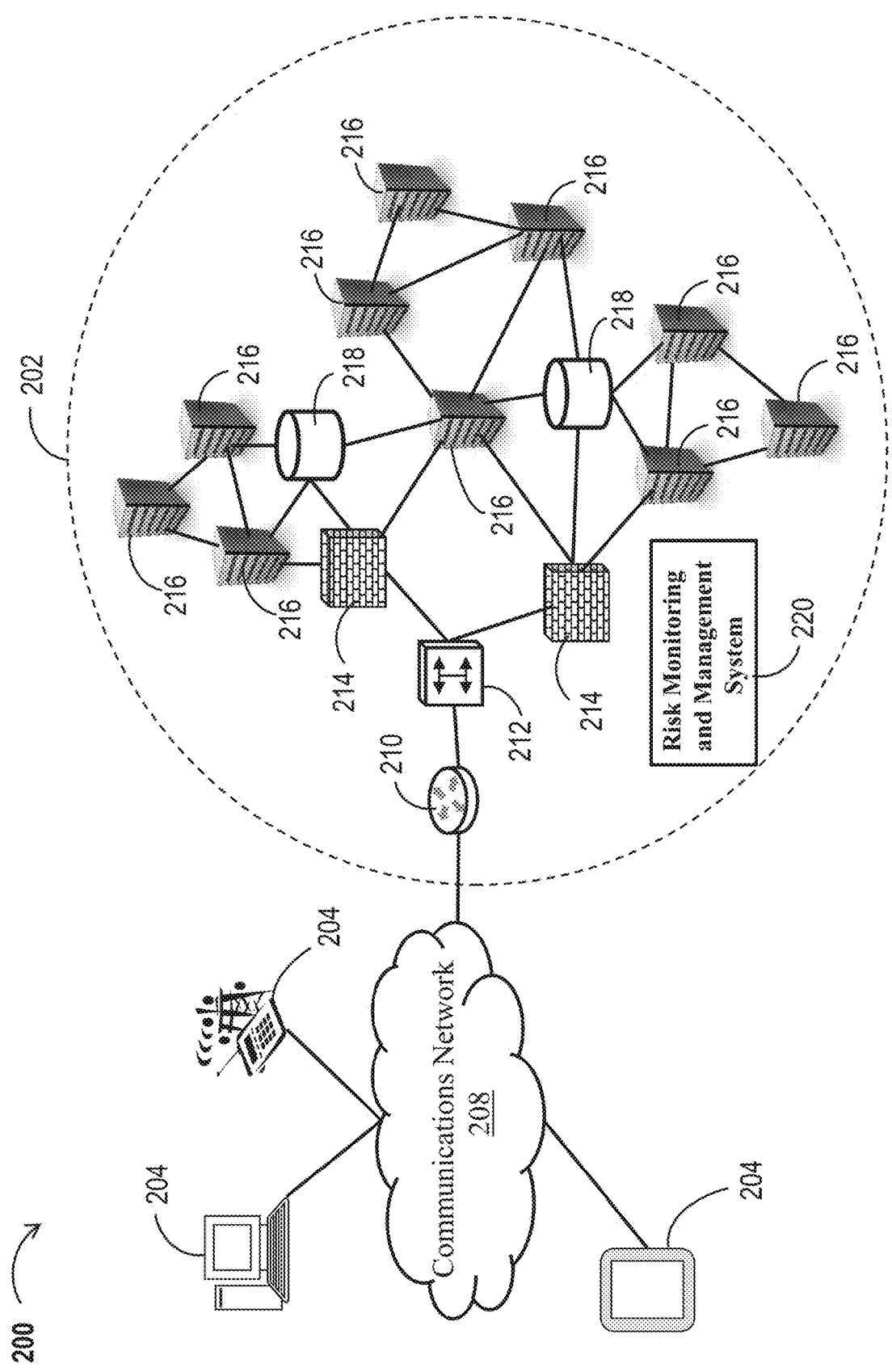
FIG. 2 is a block diagram illustrating an example computer environment employing asset risk monitoring and management, according to an example embodiment.

Referring to FIG. 2, a block diagram illustrating an example network environment 200 employing asset risk monitoring and management based on dynamic asset context is shown, according to example embodiments. The network environment 200 can include a computer environment 202 and a plurality of communication devices 204. The computer environment 202 and the plurality of communication devices 204 can be communicatively coupled via a communications network 208. The communication devices 204 can be devices of the computer environment 202 or devices communicating with the computer environment 202.

The communication network 208 can include a cellular network, a landline network, an optical network, a metropolitan area network (MAN), a wide area network (WAN), the Internet, a private network, a public network or a combination thereof, among others. The communication network 208 can be similar to the network 104 of FIG. 1A. The communication network 208 can be distributed over a plurality of geolocations, metropolitan areas or countries.

The communication devices 204 can include client devices, such as the client devices 102 of FIGS. 1A and 1B or other communication devices. The communication devices 204 can include a smart phone, a tablet device, a mart watch, other handheld device, a laptop, a desktop, a medical device with communication capability, an automated teller machine (ATM), a circuit device, a sensor device, a camera device, a sensor device, a drone, other device with communication capabilities or a combination thereof, among others. The communication devices 204 can be configured to send data to, or access data from, the computer environment 202 via the communication network 208. The computer environment 202 can be arranged in one or more geolocations or sites, and the communication devices 204 can include a device (e.g., a wireless device or an ATM) of the computer environment 202 that is located remotely from the one or more sites. The communication devices 204 can include one or more devices (e.g., a personal laptop, personal desktop, personal smart phone or personal handheld device) that are not part of the communication ecosystem 202 but are accessing one or more resources of the computer environment 202.

The computer environment 202 can include an enterprise computer network, a cloud network or system, a banking computer system, a power grid system, a network of medical devices, a social network, a communications network (e.g., wireless communications network), a media streaming system or network, a security monitoring system or a combination thereof, among others. The computer environment can include any combination of communicatively connected electronic devices, electrical devices and/or electromechanical devices. The computer environment 202 can be distributed over, or can include, a plurality of sites associated with distinct geolocations. The computer environment 202 can include one or more network devices, such as router 210, network switch 212, a modem device, a wireless router or a combination thereof, one or more firewall devices (or systems) 214, a plurality of computer servers 216, one or more databases 218, a risk monitoring system 220 or a combination thereof. The computer environment 202 can include one or more other computing devices, electronic devices, electromechanical devices, or other devices of other type.

The network devices can manage communication channels within the computer environment 202 as well as communication channels with external devices. The network devices can collect network performance data, such as data indicative of bandwidth usage, packet drop rate, number or rate of out of order packets, transport control protocol (TCP) retransmits, latency or a combination thereof among others. In some implementations, one or more network devices or a network database can maintain the collected network performance data. The collected network performance data can include information related to measured network performance parameters such as time (e.g., timestamps), traffic destination, traffic source, communication link, communication session identifier or a combination thereof, among others.

Each firewall device 214 can maintain a corresponding defined set of security rules. A system administrator of the computer environment 202 and/or the risk monitoring system 220 can manage the defined set of security rules for each firewall device 214. The firewall device(s) 214 can monitor incoming and/or outgoing network traffic, and decide whether to allow or block specific traffic based on the corresponding set of security rules. The firewall device(s) 214 can also collect data related to security of incoming and/or outgoing network traffic over time. The firewall device(s) 214 or a security database can store the collected security data. The collected security data can include, for example, logs of blocked and/or allowed network traffic, reasons (e.g., invoked security rule) for blocking network traffic, requesting entity and/or source of blocked network traffic or a combination thereof, among others.

The computer servers 216 can include one or more email servers, one or more application servers, one or more client servers, one or more file transfer protocol (FTP) servers, one or more web servers, one or more SQL servers, one or more MICROSOFT EXCHANGE servers, one or more communication servers, one or more authentication servers or a combination thereof, among others. The authentication server(s) can maintain data indicative of successful and/or failed authentications including, for example, a device identifier, a time stamp and/or used login identifier for each authentication or authentication attempt. The application server(s) can maintain data (e.g., session logs) indicative of past and/or current user sessions. For each user session, the application server(s) can store session timing information (e.g., start, end and/or duration), user identification of user initiating the session, device identifier of of communication device 204 initiating or participating in the sessions, data exchanged during the session, activities or tasks performed during the session or a combination thereof. The One or more servers 216 or resources thereof can be accessible by the communication devices 204. Each of the computer servers 216 can be accessible via the firewall(s) 214. In some implementations, one or more computer servers 214 may not be arranged behind the firewall(s) 214.

The database(s) 218 can be maintained by one or more computer servers 216 or one or more storage devices. The database(s) 216 and/or the computer server(s) can be located in a site of the computer environment 202 or a data center hosting some services associated with the computer environment 202. The database(s) 215 can store user authentication data, other user data, application data, web pages, services data, business data, research and development data, marketing data, human resources data or a combination thereof, among others. The data stored by the database(s) 218 can be used by the computer servers 216 or an be accessible by the communication devices 204. The database(s) 218 can store data with different sensitivity or importance. For instance, different access rights can be associated with distinct data sets. The access rights for each data set can be assigned to one or more users or communication devices 204 based on, for example, user profiles, defined firewall security rules, relevance of the data set to various tasks or projects, importance of the data set or a combination thereof.

The risk monitoring and management system 220 can be configured to monitor and manage asset risk for various assets of the computer environment 202. An asset can include a hardware device, a hardware system, a software application, a software module, a software system, a data resource (e.g., a database, a data file, a document and/or a data structure or web page, among others) or a combination thereof. The risk monitoring and management system 220 can be implemented as software, firmware, hardware or a combination thereof. The risk monitoring and management system 220 can be communicatively coupled to one or more network devices, firewall devices 214, computer servers 216, databases 218, communication devices 204, other devices associated with the computer environment 202 or a combination thereof. The risk monitoring and management system 220 is discussed in further detail below with regard to FIGS. 3 and 4.

Figure 3:
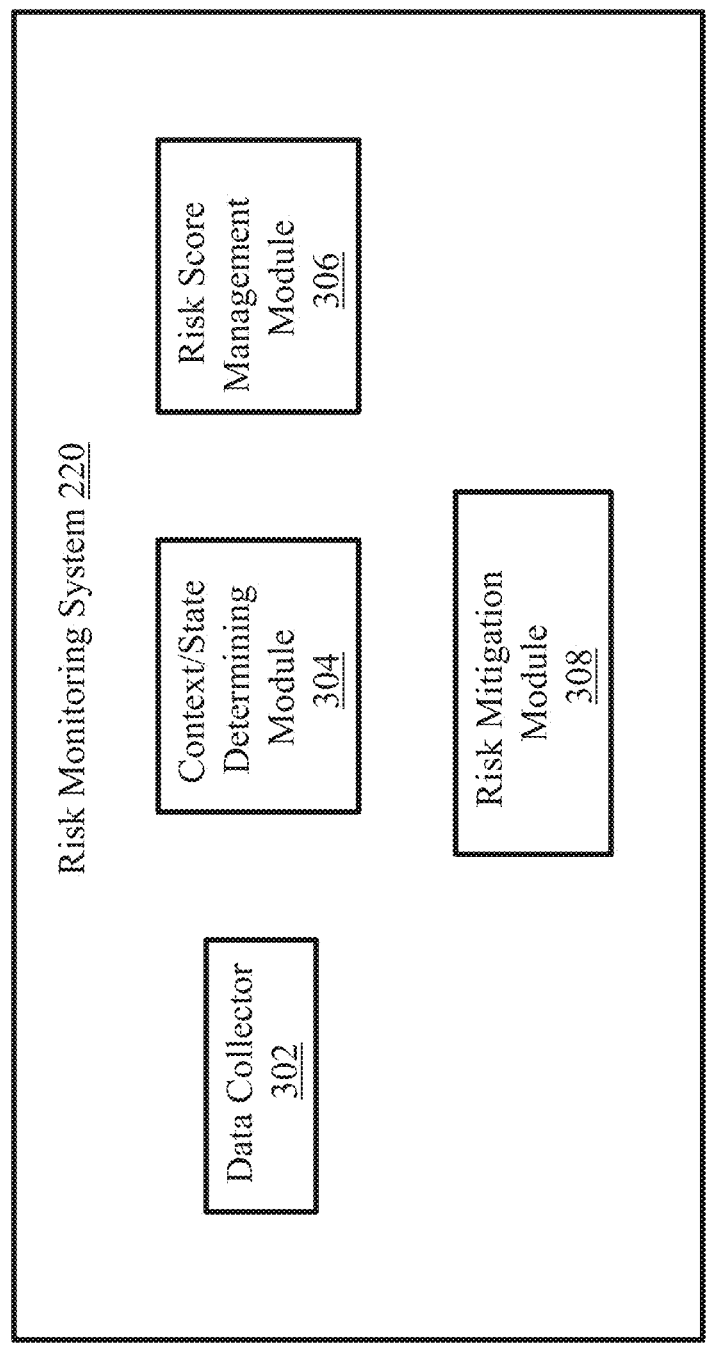
FIG. 3 shows an example block diagram of a risk monitoring and management system, according to an example embodiment.

Referring to FIG. 3, an example block diagram of a risk monitoring and management system 220 is shown, according to an example embodiment. The risk monitoring and management system 220 can include one or more data collectors 302, an asset context (or asset) determining module 304, a risk score (or profile) management module 306 and a risk mitigation module 308. Each of the modules (or components) of the risk monitoring and management system 220 can be implemented as a hardware module, a software module, a firmware module, or a combination thereof.

Figure 4:
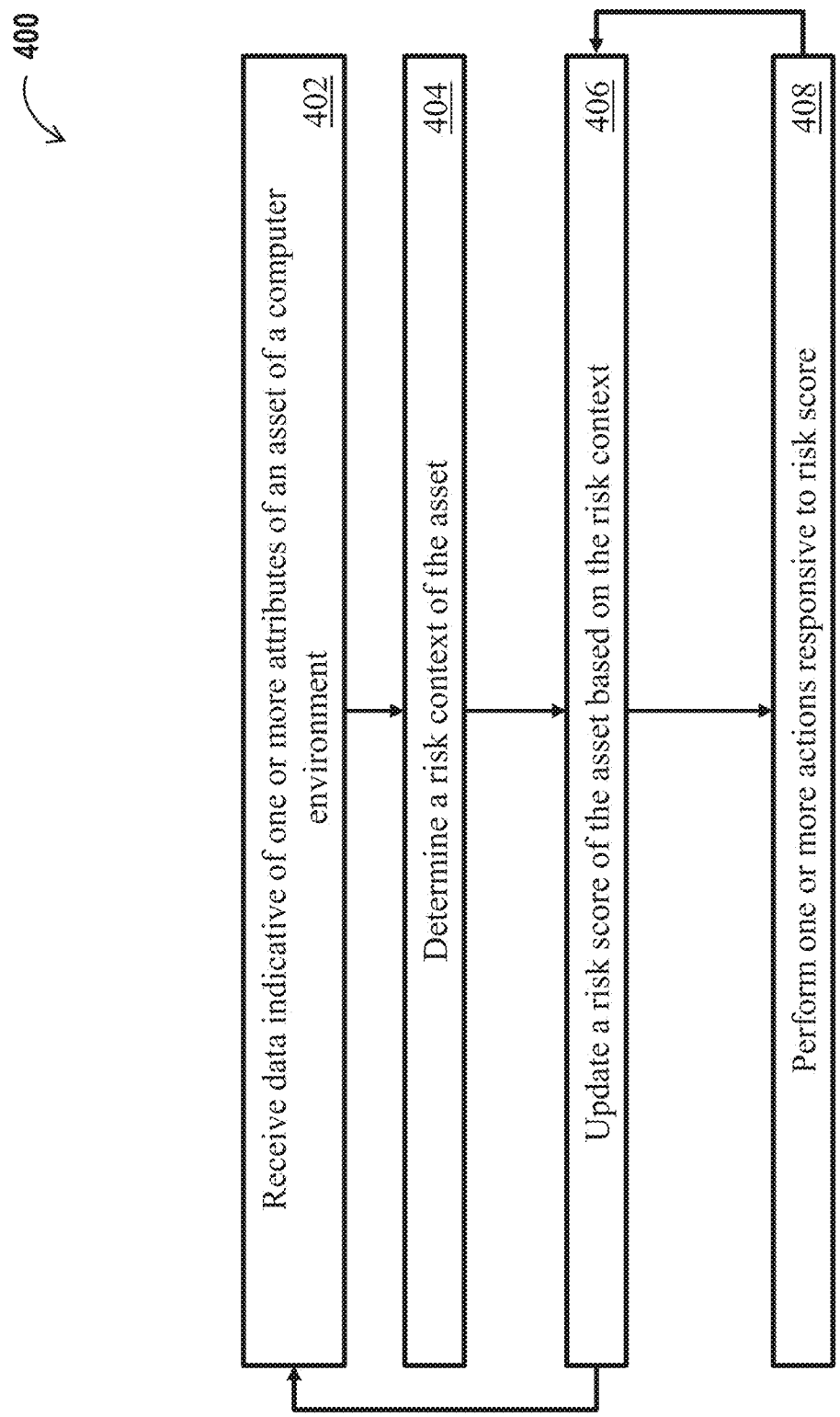
FIG. 4 shows a flowchart illustrating a method for monitoring and management asset risk in a computer environment, according to an example embodiment.

FIG. 4 shows a flowchart illustrating a method 400 for asset risk monitoring and management, according to an example embodiment. The method 400 can include the risk monitoring and management system 220 receiving (or acquiring) data indicative of one or more attributes of an asset of the computer environment 202 (STEP 402). The one or more attributes of the asset can be dynamic (e.g., time-varying, not static). The method 400 can include the risk monitoring and management system 220 determining a risk context of the asset based on the acquired data (STEP 404). The method 400 can include the risk monitoring and management system 220 determining or updating a risk score (or a risk profile) of the asset based on the risk context of the asset (STEP 406). The method 400 may include repeating steps 402 to 406 periodically or responsive to specific events. The method 400 can include the risk monitoring and management system 220 performing one or more actions (e.g., corrective, risk mitigating or data rendering actions) responsive to risk score(s) of the asset (STEP 408). In some implementations, the risk monitoring and management system 220 can perform the method 400 for various assets of the computer environment 202.

Referring to FIGS. 3 and 4, the method 400 can include the risk monitoring and management system 220 receiving (or acquiring) data indicative of one or more attributes of the asset of the computer environment 202 (STEP 402). For instance, the data collector(s) 302 can acquire data related to assets of the computer environment 202 whose risk is to be monitored and managed. The risk monitoring and management system 220 can monitor and/or manage the risk of each asset or a subset of the assets of the computer environment 202. The one or more attributes of the asset can include dynamic or time-varying attributes of the asset. The dynamic or time-varying attributes can depend on the way the asset is used or is functioning over time. The data indicative of the one or more attributes of the asset can include an identification (or indication) of a user using or accessing the asset, an indication of a geolocation of the asset, a type of a communication network to which the asset is connected, an indication of one or more recent or current activities (e.g., ongoing communication or user session(s)) associated with the asset, an indication of one or more applications or software modules currently executing on the asset, an indication of an application or software module recently installed on or recently removed from the asset, an indication of current usage of computing resources or power by the asset, an indication of current usage of network resources by the asset, an indication of data currently stored or recently accessed by the asset or a combination thereof, among others. The attributes for which data is acquired can vary based on, for example, the asset type, the user(s) using or accessing the asset, the security zone of the asset or a combination thereof, among others.

The data collector 302 can request the data indicative of the one or more attributes periodically, e.g., every few seconds, every minute or every few minutes. In some implementations, the data collector 302 can include a client collector module or component and a server collector module or component. For each of the assets to be monitored, the client collector module can reside in the asset (if the asset is a hardware device) or in the same hardware device where the asset (e.g., if the asset is a software or data asset) is residing. The client collector module can automatically send data indicative of the one or more attributes of the corresponding asset to the risk monitoring and management system 220, responsive to a change in the dynamic attributes. For instance, the client collector module can be configured to detect a change in the attributes of the corresponding asset, and send indication of the change to the risk monitoring and management system 220 (or the server collector module). The client collector module may also monitor and report to the server collector module other events associated with the corresponding asset, such as installing a new application or software, removing an existing software or application, downloading or accessing data of the computer environment 202 (or other data), tampering with configurations or settings (e.g., security configurations or settings) associated with the asset or the device hosting the asset, other activities associated with the corresponding asset or the device hosting the asset, or a combination thereof.

The data collector 302 can acquire data related to an asset from other devices or assets of the computer environment 202, such as a network device, firewall 214, computer server 216 (e.g., authentication server or application server), database 218 or a combination thereof. By acquiring data from other devices or assets, the data collector 302 can reduce the computational and/or communication load associated with data reporting of monitored assets. For instance, monitored assets (or corresponding hosting devices) can be configured or requested to report data that cannot be accessed from other devices of the computer environment 202.

The method 400 can include the risk monitoring and management system 220 determining a risk context (STEP 404). For instance, the asset context (or state) determining module 304 can determine a risk context of the asset based at least on the one or more attributes of the asset. In determining the risk context (also referred to herein as the current risk context) of the asset, the asset context (or state) determining module 304 can employ the received data indicative of the one or more attributes in combination with additional data including, for example, a user profile of the user(s) currently using or accessing the asset, the data currently stored or recently accessed by the asset, the resources accessible by or associated with the asset, the inter-asset dependencies of the asset, the projects or tasks associated with the asset, the security zone of the asset, a type of the asset, an operating system of the asset or a combination thereof, among others. Determining the risk context of the asset can include determining at least one of a user profile of a user using or accessing the asset, data stored by the asset, resources accessible by the asset, dependencies of the asset or a combination thereof, among others. The additional data can be include static attributes or features of the asset and/or other relevant data (e.g., black lists). The asset context (or state) determining module 304 or the data collector 302 can acquire the additional data from devices other than the monitored asset, such as the network devices, the firewalls 214, the computer servers 216, the databases 218 or a combination thereof, among other devices or data sources within or outside of the computer environment 202.

While the acquired data indicative of the attributes provides relevant information about the risk profile of the monitored asset, such information may not be sufficient to accurately assess the security or risk context (or state) of the asset. For instance, while the identification of the user(s) using or accessing the asset is helpful, the user profile provides more comprehensive asset security or risk information. The user profile can include, for example, the user's position, user's access rights, whether the user appears (or corresponding devices appear) in a black list, whether the user previously tampered with security settings or configurations of assets of the computer environment 202, whether the user previously had engaged in suspicious activities or events, user credit history information or a combination thereof, among others. Also, while connection to a non-secure network may be indicative of some asset risk, confirmation and/or assessment of such risk may call for knowledge of what data, applications and/or services maintained or installed by, accessible or recently accessed by, or associated with the monitored asset. Such knowledge allows for identifying sensitive data or services, if any, that may be compromised by the connection to the unsecure network. Similarly, information about prior attacks or suspicious events associated with the current geolocation of the asset or a corresponding user using or accessing the asset can help assessing the effect of the geolocation on the security or risk profile of the asset or the computer environment 202.

The asset context (or state) determining module 304 can maintain a database of information used to determine the risk context (or state) of the monitored assets. For instance, the database can maintain profiles of employees of the organization associated with the computer environment 202, a list of suspicious users or corresponding Internet protocol (IP) addresses or device identifiers, a black list of domain names, information resources or Internet protocol (IP) addresses, a black list of geolocations (e.g., countries or metropolitan regions) associated with prior suspicious events or a combination thereof. The database can maintain indications of type or sensitivity of data stored by each device of the computer environment 202, data accessible by or associated with each asset, applications or software installed on each device of the computer environment, services, applications or software accessible by or associated with each monitored asset (or each asset of the computer environment 202) or a combination thereof. The database can maintain asset interdependencies, security or risk information (e.g., asset vulnerabilities, firewall security rules, security holes or a combination thereof) of the computer environment 202, or a combination thereof. The asset context (or state) determining module 304 can update the database on a regular basis or responsive to changes associated with the assets of the computer environment 202.

The context of a given asset or device of the computer environment 202 can be defined as, or based on, a corresponding predefined list of attributes or characteristics related to the asset. The predefined list of attributes or characteristics can be a comprehensive list allowing for reliable and accurate assessment of various asset risks. Upon the data collector 302 receiving the data related to the one or more attributes, the asset context (or state) determining module 304 can supplement the received data with additional data from the maintained database or other data sources based on the corresponding predefined list of attributes or characteristics. For instance, the context of an asset or device of the computer environment 202 can include the software and/or applications installed on, running on or accessible by the asset or the device hosting the asset, the type or nature of the data stored, recently accessed or accessible by the asset or the device hosting the asset, the communications network to which the asset or the device hosting the asset is connected, the geolocation of the asset or a user thereof, the current settings and configuration of the asset or the device hosting the asset, security rules, e.g., of the firewall(s) 214, relevant to the asset or the device hosting the asset, a user profile (or information thereof) of a user using or accessing the asset, or a combination thereof, among others. The context of the asset can include a purpose of the asset, tasks and/or projects related to the asset, an indication of the importance of the asset, a list of other assets currently accessing or recently accessed the asset, a security zone associated with the asset or a combination thereof among others.

The method 400 can include the risk monitoring and management system 220 determining or updating a risk score (or a risk profile) of the asset based on the risk context of the asset (STEP 406). For instance, the risk score management module 306 can determine, for each monitored asset, a respective risk score based on the respective current context. The risk score management module 306 can assign a value to each attribute or characteristic of the predefined list of attributes or characteristics defining the context of the context of the asset. The risk score management module 306 can determine the asset risk score as a weighted sum of the values assigned to attributes or characteristics of the predefined list of attributes. In some implementations, the risk score management module 306 can use a lookup table to determine the current asset risk score based on the current context (or state) of the asset. The lookup table can match each possible context (e.g., each possible combination of values for the predefined list of attributes) to a corresponding asset risk score. The risk score management module 306 can use different lookup tables or different weighting functions for different types of assets. In some implementations, the risk score management module 306 can determine or update an asset risk profile comprising a plurality of risk scores (e.g., a vector of scores or values). The plurality of scores or values can be associated with different types of risks. The asset risk profile or score(s) can reflect the level, type or severity of each asset risk(s). The risk score management module 306 can update one or more risk scores in the risk profile of the asset.

The method 400 may include the risk monitoring and management system 220 performing one or more actions (e.g., remedial actions) responsive to updating the risk score (or risk profile) of the asset (STEP 408). For instance, the risk mitigation module 208 can be configured to take one or more corrective actions or measures responsive to the updated or determined risk score or profile of the asset of the computer environment 202. The risk mitigation module 208 can compare the risk score to a threshold value and decide based on the comparison whether to take any action or what actions or measures, if any, to take. Corrective actions or measures can include the risk mitigation module 208 adjusting one or more configuration or setting parameters of at least one of the asset or another asset of the computer environment 202. For example, the risk mitigation module 208 can modify a security rule of the firewall(s) 214 (e.g., add a new rule, delete an existing rule or edit an existing rule), responsive to the risk score or risk profile of the asset. The risk mitigation module 208 can change a security zone assigned to an asset responsive to the risk score or risk profile of the asset. The risk mitigation module 208 can lock, quarantine or limit access to the asset, a component thereof or a device hosting the asset. For example, the risk mitigation module 208 can take such action responsive to the geolocation of the asset or a user thereof, an asset connection to a non-secure network, or a suspicious attempt to change (or a change of) a configuration parameter of the asset, a suspicious activity associated with the asset or a combination of both. The risk mitigation module 208 can limit access of the asset to one or more resources of the computer environment 202. For example, the risk mitigation module 208 can limit or block access of sensitive data by the asset.

In some implementations, the risk mitigation module 208 can initiate execution of a software or application responsive the risk score(s) of the asset. For example, the risk mitigation module 208 can trigger dual user authentication responsive to the risk score of the asset. The risk mitigation module 208 can activate or require encryption of data sent to, or received from, the asset, data stored by the asset or data accessible by the asset responsive to the risk score of the asset. The risk mitigation module 208 can archive or move data responsive to the risk score of the asset.

In some implementations, the risk mitigation module 208 can provide the risk score risk profile of the asset for display on a display or output device. The risk mitigation module 208 can render or display different risk scores associated with different users using or accessing the same asset or device. The risk mitigation module 208 can render or display risk scores of the asset over time, e.g., on dashboard, in association with changes in user profile, geolocation, stored or accessible data, installed or accessible applications, networks or a combination thereof, among others. The risk mitigation module 208 can provide an alert signal for display on a display device, e.g., to a system administrator or IT team, responsive to the risk score or risk profile of the asset. The alert signal can be indicative of the nature and/or severity of the risk(s) associated with one or more assets. The risk mitigation module 208 can output one or more proposals of how to eliminate or mitigate the risk(s).

In some implementations, the risk mitigation module 208 can compare the risk score of the asset to a threshold value, and adjust a configuration parameter of the at least one of the asset or another asset based on the comparison of the risk score of the asset to the threshold value. Adjusting the configuration parameter of the at least one of the asset or the other asset can include limiting access of the asset to one or more resources of the computer environment responsive to the risk score of the asset. Adjusting the configuration parameter of the at least one of the asset or the other asset can include activating data encryption for the asset responsive to the risk score of the asset. Adjusting the configuration parameter of the at least one of the asset or the other asset can include quarantining one or more components of the asset responsive to the risk score of the asset. Adjusting the configuration parameter of the at least one of the asset or the other asset can include changing a security zone assigned to the asset responsive to the risk score of the asset. Adjusting the configuration parameter of the at least one of the asset or the other asset can include changing one or more security rules associated with a firewall of the computer environment responsive to the risk score of the asset.

The methods, e.g., method 400, described in this disclosure can be carried out by computer code instructions stored on a computer-readable medium. The computer code instructions, when executed by one or more processors of one or more computing device, can cause the computing device to perform the method(s) described herein.

While the disclosure has been particularly shown and described with reference to specific embodiments, it should be understood by those skilled in the art that various changes in form and detail may be made therein without departing from the spirit and scope of the invention described in this disclosure.

While this disclosure contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A system comprising:
   one or more processors communicatively coupled to a computer environment; and
   a memory storing computer code instructions, the computer code instructions, when executed by the one or more processors, cause the one or more processors to:
     receive data indicative of a plurality of attributes of an asset of the computer environment based at least on a type of the asset and a security zone of the asset, the plurality of attributes comprising a static attribute and one or more attributes that vary over time;
     determine a risk context of the asset based on the data indicative of the one or more attributes of the asset, the risk context identifying a user profile of a user using or accessing the asset, data stored by the asset and resources accessible by the asset;
     identify a weighting function, from different weighting functions, based at least on the type of asset;
     update a risk score of the asset based at least on the risk context, the risk score of the asset comprising a weighted sum of values assigned to the plurality of attributes using the weighting function based at least on the type of asset, the values assigned to the plurality of attributes based at least on one or more different types of risks associated with the risk context;
     receive additional data indicative of changes to the one or more attributes of the asset of the computer environment that vary over time;
     determine the risk context of the asset based on the changes to the one or more attributes, the risk context identifying the security zone of the asset, a change the user using or accessing the asset, a change in data stored by the asset and a change in resources accessible by the asset;
     update the risk score of the asset based at least on the changes to the risk context;
     change the security zone assigned to the asset responsive to the risk score of the asset; and
     adjust, responsive to the risk score of the asset, at least one of a configuration parameter of at least one of the asset or another asset to mitigate a security risk associated with the asset.

2. The system of claim 1, wherein the one or more processors are further configured to:
   compare the risk score of the asset to a threshold value; and
   adjust the configuration parameter of the at least one of the asset or said another asset based on comparison of the risk score of the asset to the threshold value.

3. The system of claim 1, wherein in adjusting the configuration parameter of the at least one of the asset or said another asset, the one or more processors are configured to limit access of the asset to one or more resources of the computer environment responsive to the risk score of the asset.

4. The system of claim 1, wherein in adjusting the configuration parameter of the at least one of the asset or said another asset, the one or more processors are configured to activate data encryption for the asset responsive to the risk score of the asset.

5. The system of claim 1, wherein in adjusting the configuration parameter of the at least one of the asset or said another asset, the one or more processors are configured to quarantine one or more components of the asset responsive to the risk score of the asset.

6. The system of claim 1, wherein in adjusting the configuration parameter of the at least one of the asset or said another asset, the one or more processors are configured to change a security zone assigned to the asset responsive to the risk score of the asset.

7. The system of claim 1, wherein in adjusting the configuration parameter of the at least one of the asset or said another asset, the one or more processors are configured to change one or more security rules associated with a firewall of the computer environment responsive to the risk score of the asset.

8. The system of claim 1, wherein the one or more processors are further configured to provide at least one of an indication of the risk score or an alert signal for display on a display device, responsive to the risk score of the asset.

9. The system of claim 1, wherein the data indicative of the attributes of the asset includes at least one of:
   an indication of a type of communication network to which the asset is currently connected;
   an indication of a geolocation of the asset;
   an indication of a user using or accessing the asset;
   an indication of one or more recent activities of the asset;
   an indication of one or more applications or software modules executing on the asset; or
   an indication of application or software module recently installed on or recently removed from the asset.

10. The system of claim 1, wherein in determining the risk context, the one or more processors are configured to perform at least one of:
    determine a user profile of a user using or accessing the asset;
    determine data stored by the asset;
    determine resources accessible by the asset; or
    determine dependencies of the asset.

11. A method comprising:
    receiving, by one or more processors, data indicative of attributes of an asset of the computer environment based at least on a type of the asset and a security zone of the asset, the attributes comprising a static attribute and one or more attributes that vary over time;
    determining, by the one or more processors, a risk context based on the data indicative of the attributes of the asset, the risk context identifying a user profile of a user using or accessing the asset, data stored by the asset and resources accessible by the asset;
    identifying a weighting function, from different weighting functions, based at least on the type of asset;
    updating, by the one or more processors, a risk score of the asset based at least on the risk context, the risk score of the asset comprising a weighted sum of values assigned to the attributes using the weighting function based at least on the type of asset, the values assigned to the attributes based at least on one or more different types of risks associated with the risk context;
    receive additional data indicative of changes to the one or more attributes of the asset of the computer environment that vary over time;
    determine the risk context of the asset based on the changes to the one or more attributes, the risk context identifying the security zone of the asset, a change in the user using or accessing the asset, a change in data stored by the asset and a change in resources accessible by the asset;

update the risk score of the asset based at least on the changes to the risk context;

change the security zone assigned to the asset responsive to the risk score of the asset; and adjusting, by the one or more processors, responsive to the risk score of the asset, a configuration parameter of at least one of the asset or another asset to mitigate a security risk associated with the asset.

12. The method of claim 11, further comprising:
comparing the risk score of the asset to a threshold value; and adjusting the at least one of the configuration parameter of the at least one of the asset or said another asset based on comparison of the risk score of the asset to the threshold value.

13. The method of claim 11, wherein adjusting the configuration parameter of the at least one of the asset or said another asset includes limiting access of the asset to one or more resources of the computer environment responsive to the risk score of the asset.

14. The method of claim 11, wherein adjusting the configuration parameter of the at least one of the asset or said another asset includes activating data encryption for the asset responsive to the risk score of the asset.

15. The method of claim 11, wherein adjusting the configuration parameter of the at least one of the asset or said another asset includes quarantining one or more components of the asset responsive to the risk score of the asset.

16. The method of claim 11, wherein adjusting the configuration parameter of the at least one of the asset or said another asset includes at least one of:

changing a security zone assigned to the asset responsive to the risk score of the asset; or changing one or more security rules associated with a firewall of the computer environment responsive to the risk score of the asset.

17. The method of claim 11, further comprising providing at least one of an indication of the risk score or an alert signal for display on a display device, responsive to the risk score of the asset.

18. The method of claim 11, wherein the data indicative of the attributes of the asset includes at least one of:

an indication of a type of communication network to which the asset is connected;

an indication of a geolocation of the asset;

an indication of a user using or accessing the asset;

an indication of one or more recent activities of the asset;

an indication of one or more applications or software modules executing on the asset; or an indication of application or software module recently installed on or recently removed from the asset.

19. The method of claim 11, wherein determining the risk context includes:

determining a user profile of a user using or accessing the asset;

determining data stored by the asset;

determining resources accessible by the asset; or determining dependencies of the asset.

20. A non-transitory computer-readable medium storing computer executable instructions, the computer executable instructions when executed by one or more processors cause the one or more processors to:

receive data indicative of a plurality of attributes of an asset of the computer environment based at least on a type of the asset and a security zone of the asset, the plurality of attributes comprising a static attribute and one or more attributes that vary over time;

determine a risk context of the asset based on the data indicative of the one or more dynamic attributes of the asset, the risk context identifying a user profile of a user using or accessing the asset, data stored by the asset and resources accessible by the asset;

identify a weighting function, from different weighting functions, based at least on the type of asset;

update a risk score of the asset based at least on the risk context, the risk score of the asset comprising a weighted sum of values assigned to the one or more attributes using the weighting function based at least on the type of asset, the values assigned to the one or more attributes based at least on one or more different types of risks associated with the risk context;

receive additional data indicative of changes to the one or more attributes of the asset of the computer environment that vary over time;

determine the risk context of the asset based on the changes to the one or more attributes, the risk context identifying the security zone of the asset, a change in the user using or accessing the asset, a change in data stored by the asset and a change in resources accessible by the asset;

update the risk score of the asset based at least on the changes to the risk context;

change the security zone assigned to the asset responsive to the risk score of the asset; and adjust, responsive to the risk score of the asset, at least one of a configuration parameter of at least one of the asset or another asset to mitigate a security risk associated with the asset.

* * * * *